（12）United States Patent
Tosdale et al.

(10) Patent No.: US 8,869,682 B2
(45) Date of Patent: Oct. 28, 2014

(54) FOOD PAN HAVING CORNER STRUCTURE

(75) Inventors: David R. Tosdale, Manitowoc, WI (US);
Theresa M. Mayer, Sheboygan, WI (US); Ronald J. McGettrick, Sheboygan, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 531 days.

(21) Appl. No.: 12/892,657

(22) Filed: Sep. 28, 2010

(65) Prior Publication Data
US 2012/0074032 A1 Mar. 29, 2012

(51) Int. Cl.
| | |
|---|---|
| A22C 7/00 | (2006.01) |
| A23P 1/00 | (2006.01) |
| A47J 43/18 | (2006.01) |
| B65D 1/42 | (2006.01) |
| B65D 21/00 | (2006.01) |
| B65D 85/62 | (2006.01) |
| A47J 27/16 | (2006.01) |

(52) U.S. Cl.
CPC ...................... *A47J 27/16* (2013.01)
USPC ............... 99/426; 220/657; 206/518

(58) Field of Classification Search
USPC ............ 99/423, 426, 449; 220/657, 670, 756, 220/759, 767, 768, 769, 770, 669, 675, 574, 220/573.1; 206/557, 518, 519, 499, 514, 206/558, 505, 504, 515
See application file for complete search history.

(56) References Cited

U.S. PATENT DOCUMENTS

| 2,602,568 A | 7/1952 | Kinny |
|---|---|---|
| D287,809 S | 1/1987 | Alexander |

(Continued)

FOREIGN PATENT DOCUMENTS

| WO | WO-00/59351 | 10/2000 |
|---|---|---|
| WO | WO 2008/088352 A1 | 7/2008 |
| WO | WO 2010/039455 | 4/2010 |

OTHER PUBLICATIONS

U.S. Appl. No. 11/623,557, filed Jan. 16, 2007, Liebzeit.

(Continued)

*Primary Examiner* — Henry Yuen
*Assistant Examiner* — Hemant Mathew
(74) *Attorney, Agent, or Firm* — Foley & Lardner LLP

(57) ABSTRACT

A food pan is configured for use with a serving station having wells within which to support the food pan. The food pan includes a bottom, a side wall, a rim, and four corner structures. The bottom has a substantially rectangular periphery. The side wall is connected to the bottom, and projects from the rectangular periphery of the bottom in an upward direction. Together, the bottom and side wall form a volume configured to support contents of the food pan. The rim is connected to the side wall on an end of the side wall opposite to the bottom, and extends from the side wall in an outward direction away from the volume formed by the side wall and the bottom. The cross-section of the rim further includes an ascending portion connected to the side wall, a top portion connected to the ascending portion, and a descending portion connected to the top portion. The ascending and descending portions are rounded. The four corner structures are located between the side wall and the rim, with each corner structure associated with one of the corners of the rectangular periphery of the bottom of the food pan. Each corner structure further includes a base side connected to the side wall and two ascending sides connected to the base side. The two ascending sides extend along both the side wall and the ascending portion of the cross-section of the rim. Additionally, the ascending sides extend from opposite ends of the base side and terminate in the top portion of the cross-section of the rim.

11 Claims, 7 Drawing Sheets

(56) References Cited

U.S. PATENT DOCUMENTS

| | | | |
|---|---|---|---|
| 4,660,734 A | 4/1987 | Heaney et al. | |
| D291,526 S * | 8/1987 | Heaney et al. | D7/354 |
| 4,804,092 A | 2/1989 | Jones | |
| 4,828,112 A | 5/1989 | Vollrath et al. | |
| D305,410 S * | 1/1990 | Tyler | D9/425 |
| 5,035,327 A | 7/1991 | Denzin et al. | |
| 5,131,708 A | 7/1992 | Denzin | |
| D333,944 S | 3/1993 | Denzin et al. | |
| D375,652 S | 11/1996 | Hayes | |
| 5,632,398 A | 5/1997 | Baltus et al. | |
| D382,440 S | 8/1997 | Fonville | |
| 5,676,276 A * | 10/1997 | Zielinski et al. | 220/657 |
| 5,762,226 A | 6/1998 | Baltus et al. | |
| D417,361 S | 12/1999 | Mittmann et al. | |
| D422,836 S | 4/2000 | Mittmann | |
| D427,482 S | 7/2000 | Mittmann | |
| D431,148 S | 9/2000 | Mittmann | |
| D432,866 S | 10/2000 | Harrison | |
| D435,390 S | 12/2000 | Mittmann | |
| D443,173 S * | 6/2001 | Danielsen et al. | D7/354 |
| D446,993 S | 8/2001 | Zank | |
| D446,994 S | 8/2001 | Zank | |
| D449,205 S | 10/2001 | Zank | |
| 6,349,843 B1 | 2/2002 | Mittmann et al. | |
| D454,751 S | 3/2002 | Zank | |
| 6,415,945 B1 * | 7/2002 | Zank et al. | 220/657 |
| D469,300 S | 1/2003 | Nakazawa | |
| 6,557,720 B2 * | 5/2003 | Tosdale et al. | 220/657 |
| 6,568,534 B2 * | 5/2003 | Zank | 206/508 |
| D517,366 S | 3/2006 | Oztiryaki | |
| D529,755 S | 10/2006 | Lobman et al. | |
| 7,347,327 B2 * | 3/2008 | Lobman et al. | 206/518 |
| D569,169 S | 5/2008 | Munson | |
| D575,095 S * | 8/2008 | Schreiber-Pethan et al. | D7/354 |
| D596,893 S | 7/2009 | Tosdale et al. | |
| D597,371 S | 8/2009 | Tosdale et al. | |
| D613,108 S | 4/2010 | Tosdale et al. | |
| D620,305 S | 7/2010 | Tosdale et al. | |
| D620,306 S | 7/2010 | Tosdale et al. | |
| 7,866,503 B2 | 1/2011 | Liebzeit | |
| 2001/0019060 A1 | 9/2001 | Zank | |
| 2001/0035418 A1 * | 11/2001 | Tosdale et al. | 220/657 |
| 2005/0252814 A1 | 11/2005 | Lobman et al. | |
| 2008/0169294 A1 | 7/2008 | Liebzeit | |
| 2008/0169295 A1 | 7/2008 | Liebzeit | |
| 2008/0185390 A1 | 8/2008 | Liebzeit | |
| 2008/0296307 A1 | 12/2008 | Liebzeit | |
| 2010/0071567 A1 | 3/2010 | Tosdale et al. | |
| 2010/0181321 A1 | 7/2010 | Liebzeit | |

OTHER PUBLICATIONS

International Search Report and Written Opinion for International Application No. PCT/US2011/051588, mail date Apr. 9, 2012, 6 pages.

Vollrath, Equipment and Smallwares Catalog, 2010-2011, Smallwares, 21 pages.

U.S. Appl. No. 29/366,399, filed Jul. 23, 2010, Tosdale et al.

Notice of Allowance for U.S. Appl. No. 29/375,857, mail date May 3, 2011, 6 pages.

* cited by examiner

FOOD PAN HAVING CORNER STRUCTURE

BACKGROUND

The present invention relates generally to the field of food pans for serving stations. More specifically, the present invention relates to food pans having a unique corner structure.

SUMMARY

One embodiment of the invention relates to a food pan configured for use with a serving station having wells within which to support the food pan. The food pan includes a bottom, a side wall, a rim, and four corner structures. The bottom has a substantially rectangular periphery. The side wall is connected to the bottom, and projects from the rectangular periphery of the bottom in an upward direction. Together, the bottom and side wall form a volume configured to support contents of the food pan. The rim is connected to the side wall on an end of the side wall opposite to the bottom, and extends from the side wall in an outward direction away from the volume formed by the side wall and the bottom. The cross-section of the rim further includes an ascending portion connected to the side wall, a top portion connected to the ascending portion, and a descending portion connected to the top portion. The ascending and descending portions are rounded. The four corner structures are located between the side wall and the rim, with each corner structure associated with one of the corners of the rectangular periphery of the bottom of the food pan. Each corner structure further includes a base side connected to the side wall and two ascending sides connected to the base side. The two ascending sides extend along both the side wall and the ascending portion of the cross-section of the rim. Additionally, the ascending sides extend from opposite ends of the base side and terminate in the top portion of the cross-section of the rim.

Another embodiment of the invention relates to a food pan configured for use with a serving station having wells within which to support the food pan. The food pan includes a bottom, a side wall, a rim, and four corner structures. The bottom has a substantially rectangular periphery. The side wall is connected to the bottom, and projects from the rectangular periphery of the bottom in an upward direction. Together, the bottom and side wall form a volume configured to support contents of the food pan. The rim is connected to the side wall on an end of the side wall opposite to the bottom, and extends from the side wall in an outward direction away from the volume formed by the side wall and the bottom. The cross-section of the rim further includes an ascending portion connected to the side wall, a top portion connected to the ascending portion, and a descending portion connected to the top portion. The ascending and descending portions are rounded. At least one of the ascending portion and the descending portion of the cross-section of the rim has a radius of curvature that is greater than the cross-sectional length of the top portion of the rim. The four corner structures are located between the side wall and the rim, with each corner structure associated with one of the corners of the rectangular periphery of the bottom of the food pan. Each corner structure further includes a base side connected to the side wall and two ascending sides connected to the base side. The ascending sides extend from opposite ends of the base side.

Yet another embodiment of the invention relates to One embodiment of the invention relates to a food pan configured for use with a serving station having wells within which to support the food pan. The food pan includes a bottom, a side wall, a rim, and four corner structures. The bottom has a substantially rectangular periphery. The side wall is connected to the bottom, and projects from the rectangular periphery of the bottom in an upward direction. Together, the bottom and side wall form a volume configured to support contents of the food pan. The rim is connected to the side wall on an end of the side wall opposite to the bottom, and extends from the side wall in an outward direction away from the volume formed by the side wall and the bottom. The cross-section of the rim further includes an ascending portion connected to the side wall, a top portion connected to the ascending portion, and a descending portion connected to the top portion. The ascending and descending portions are rounded. The four corner structures are located between the side wall and the rim, with each corner structure associated with one of the corners of the rectangular periphery of the bottom of the food pan. Each corner structure further includes a base side connected to the side wall and two ascending sides connected to the base side. The two ascending sides extend along both the side wall and the ascending portion of the cross-section of the rim. The ascending sides extend from opposite ends of the base side. Ends of the two ascending sides that are opposite to the base side for each corner structure are spaced apart from each other along the rim, forming a gap therebetween for pouring the contents of the food pan therethrough. The length of the gap is less than one-tenth the length of the base side of each corner structure.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
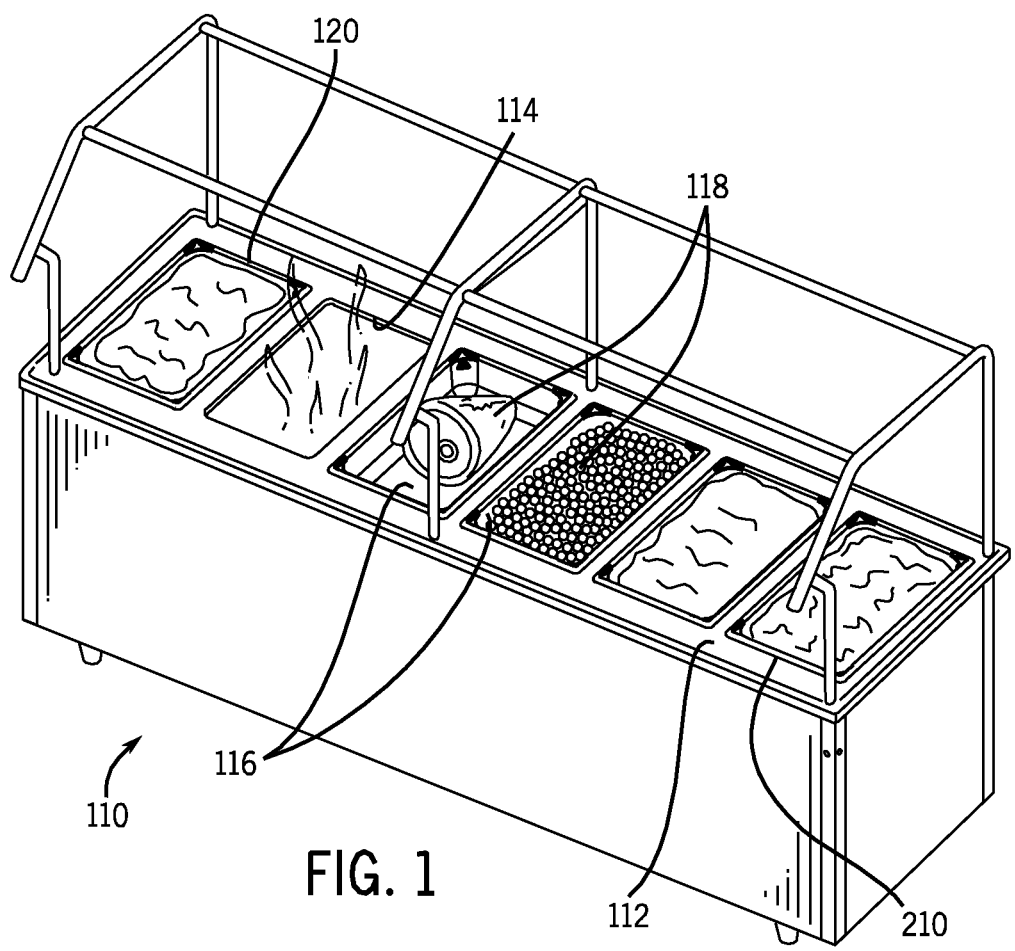
FIG. 1 is perspective view of a serving station according to an exemplary embodiment.

Referring to FIG. 1, a serving station 110 (e.g., buffet-style food station, steam table, chaffer, etc.) includes a top surface 112 having wells 114 formed therein. The wells 114 are sized and configured to receive one or more food pans 116. According to an exemplary embodiment, the food pans 116 are rectangular (e.g., oblong rectangular, square) and include a volume designed to support a variety of contents 118, including food items, liquids, napkins, utensils, or other items. The food pans 116 also include a rim 120 that has an outside periphery slightly wider and longer than the openings of the wells 114. During operational use of the serving station 110, the rim 120 of a food pan 116 is supported by the top surface 112 of the serving station 110 and the rest of the food pan 116 is placed into the well 114.

In some embodiments, heating or cooling systems are integrated with the serving station 110 (e.g., heating coils, refrigeration components), which serve to control the temperature of the wells 114. Typically the food pans 116 are formed from metal, ceramic, or another thermally-conductive material allowing heat to transfer to the contents 118 of the food pan 116 from the well 114 or vice versa, which at least partially controls the temperature of the contents 118 of the food pan 116. In some embodiments, the rim 120 of a food pan 116 forms a seal between the food pan 116 and the top surface 112 of the serving station 110, which helps to prevent cool air or steam from escaping the serving station 110, around the rim of one of the food pans 116.

In some contemplated applications, the food pans 116 are carried to and from the serving station 110 as necessary to refill the contents 118 of the food pans 116 and to maintain the supply of the contents 118 provided by the serving station 110. The material forming each food pan 116 alone, with or without contents 118, may be relatively heavy. As such, if the food pan 116 is accidentally dropped, the food pan 116 may be permanently deformed (e.g., dented, dinged, bent, warped, etc.). Plastic deformation or cracking of the rim 120 of a food pan 116 can damage the seal between the food pan 116 and the serving station 110, harming the efficiency of the serving station 110. In some embodiments, the food pans 116 include a reinforcement structure 122 in one or more corners of the food pan 116 to help prevent inadvertent deformation of the food pans 116.

Figure 2:
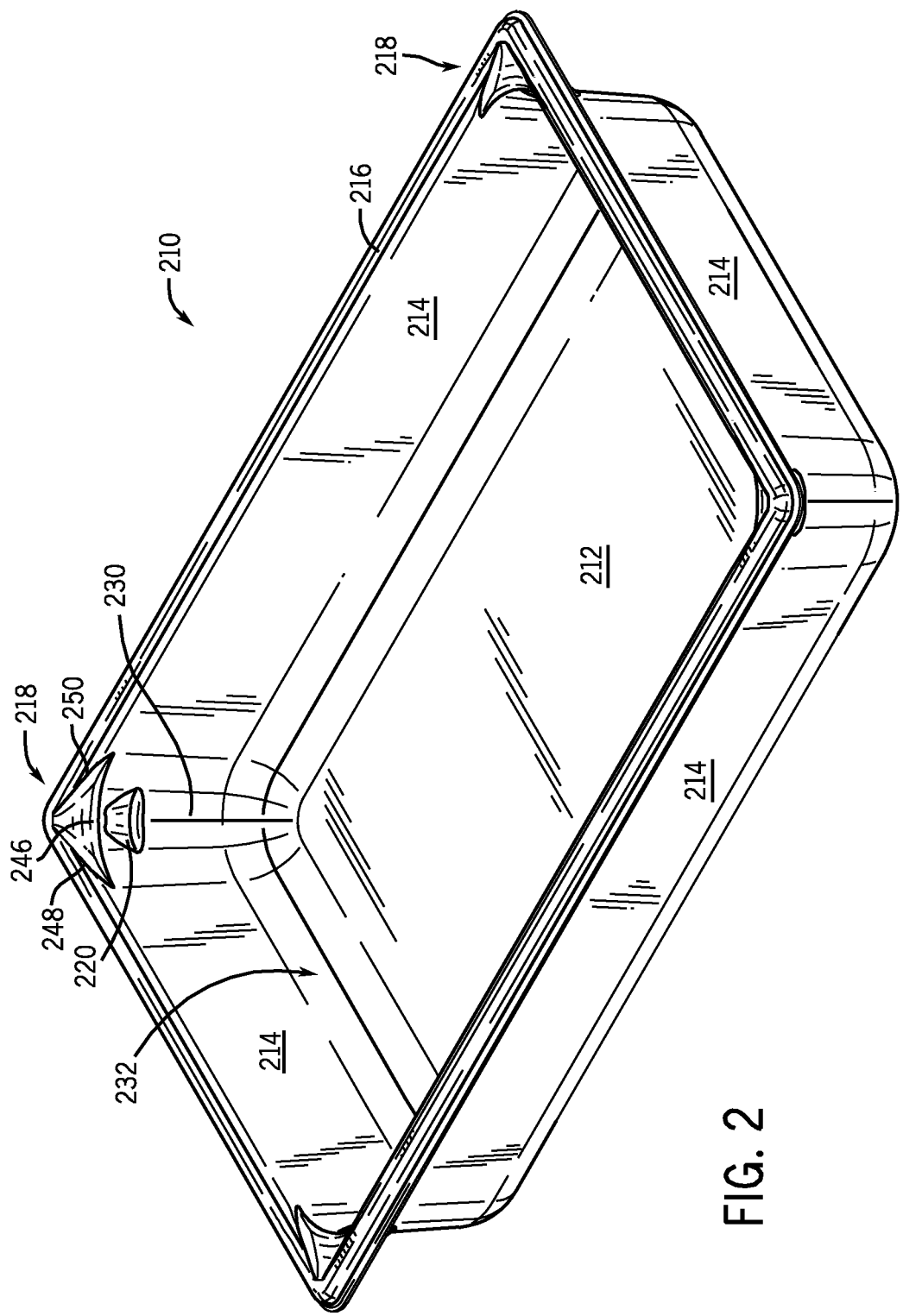
FIG. 2. is a perspective view of a food pan according to an exemplary embodiment.

Referring now to FIG. 2, a food pan 210 includes a bottom 212, a side wall 214 connected to and extending upward from the bottom 212, and a rim 216 connected to and extending outward from the side wall 214. Between the side wall 214 and the rim 216, the food pan 210 further includes a corner structure 218 designed to strengthen and reinforce the rim 216. In some embodiments, the corner structure 218 may be further configured to facilitate pouring contents (e.g., liquid) from the food pan 210. Below the corner structure 218, the food pan may further include an anti jam feature 220 (e.g., recess, ledge) to assist with stacking of the food pan 210 with other such food pans (see, e.g., FIG. 10). According to an exemplary embodiment, the anti-jam feature 220 extends from the food pan 210 to rest upon the corner structure 218 of a similar food pan during stacking, in order to separate the food pan 210 from the similar food pan. In some such embodiments, the anti jam feature 220 maintains a body of air between the food pan 210 and the similar food pan, where the air is in free communication with the environment such that a vacuum is not formed between the food pan 210 and the similar food pan.

Figure 3:
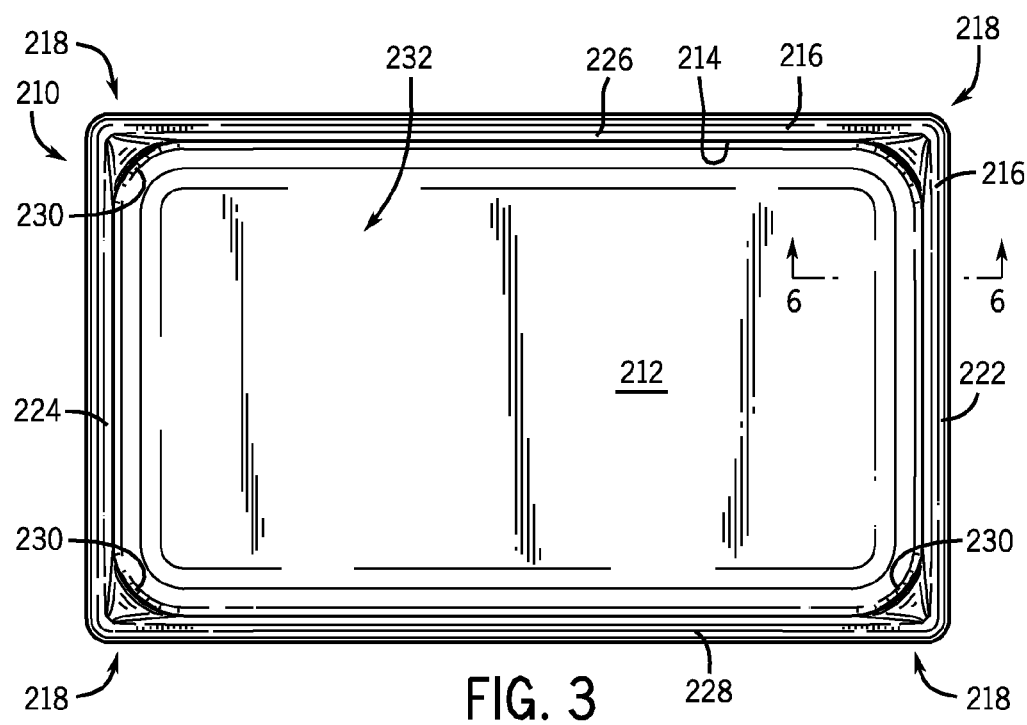
FIG. 3 is a top view of the food pan of FIG. 2.

Referring to FIG. 3, according to an exemplary embodiment, the bottom 212 of the food pan 210 includes a substantially rectangular periphery, which includes a first two sides 222, 224 (e.g., front and back) that are perpendicular to a second two sides 226, 228 (e.g., left and right). According to an exemplary embodiment, the first sides 222, 224 intersect the second sides in rounded corners 230 (i.e., rounded about a vertical axis). In some embodiments the bottom 212 is flat, while in other contemplated embodiments the bottom 212 of the food pan 210 may include partitioning structure, slope, or is otherwise contoured.

Figure 4:
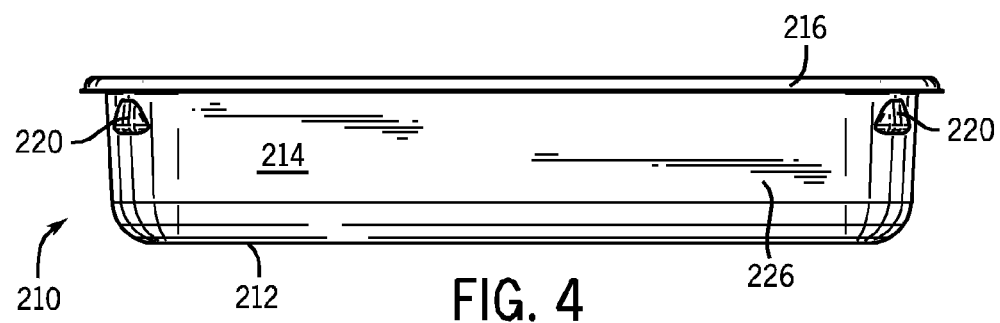
FIG. 4 is a side view of the food pan of FIG. 2.
Figure 5:
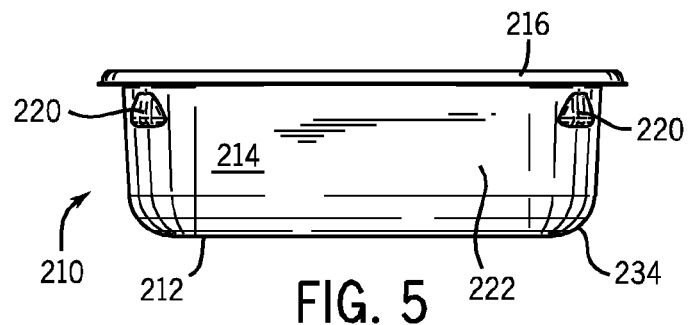
FIG. 5 is an end view of the food pan of FIG. 2.

Referring to FIG. 4-5, the side wall 214 is connected to (e.g., integral with, fastened to) the bottom 212 (FIG. 3) of the food pan 210. FIG. 4 shows a longer side (one of sides 226, 228) of the food pan 210 and FIG. 5 shows an end side (one of sides 222, 224). Together the side wall 214 and the bottom 212 form a volume 232 for supporting the contents (see, e.g., contents 118 as shown in FIG. 1) of the food pan 210. According to an exemplary embodiment, the side wall 214 is connected to the bottom 212 by way of a rounded corner 234 (FIG. 6), rounded about a horizontal axis. Rounding the corner 234 between the side wall 214 and the bottom 212 of the food pan 210 may allow for easier cleaning of the food pan 210 by widening an otherwise hard-to-reach corner 234.

According to an exemplary embodiment, the side wall 214 extends upward from the rectangular periphery of the bottom 212. In some embodiments, the side wall 214 is substantially perpendicular to the bottom 212, and may be angled slightly outward from the bottom 212 while extending toward the rim 216. In some such embodiments, the side wall 214 is angled between about 90- to 110-degrees relative to the bottom 212 of the food pan 210. Although shown with specific dimensional relationships in FIGS. 3-5 (e.g., ratio of length-to-height, width-to-length, etc.), in other embodiments, the food pan 210 is narrower, wider, shorter, longer, deeper, and/or shallower than the embodiment shown in FIGS. 3-5. In other contemplated embodiments, a non-rectangular food pan includes one or more corners having a structure as described herein.

Figure 6:
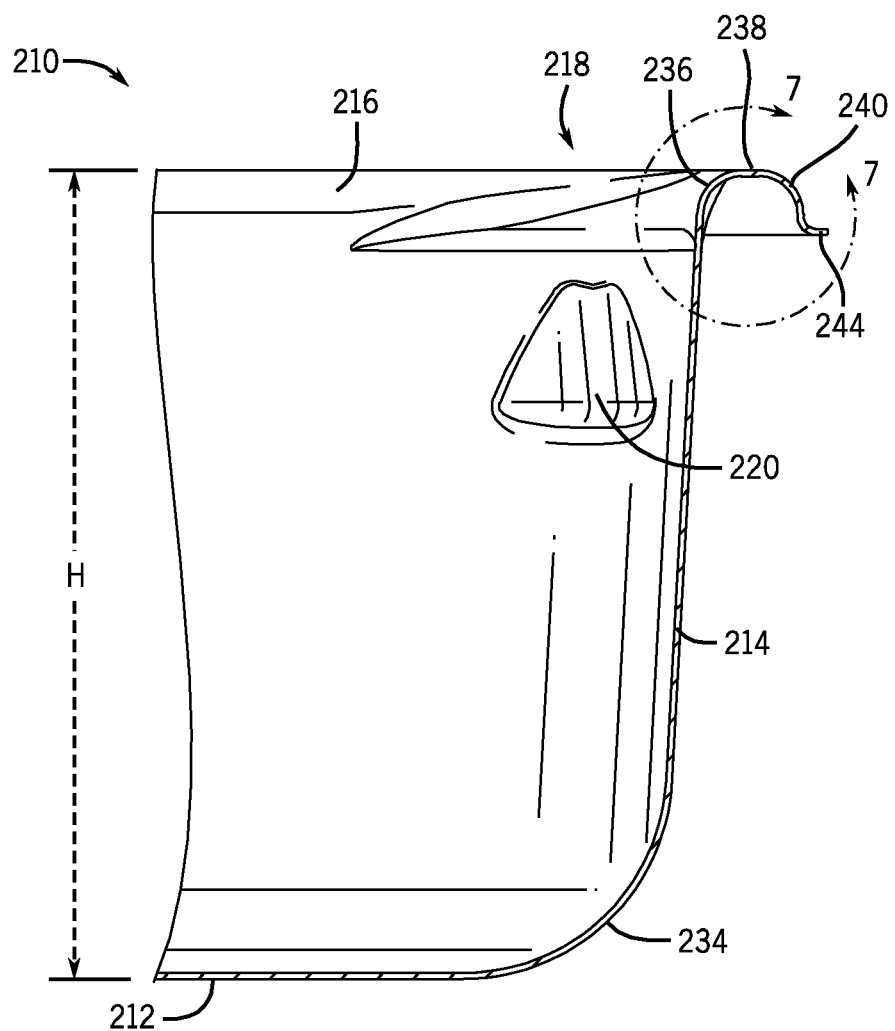
FIG. 6 is a sectional view of the food pan of FIG. 3 taken along line 6-6.
Figure 7:
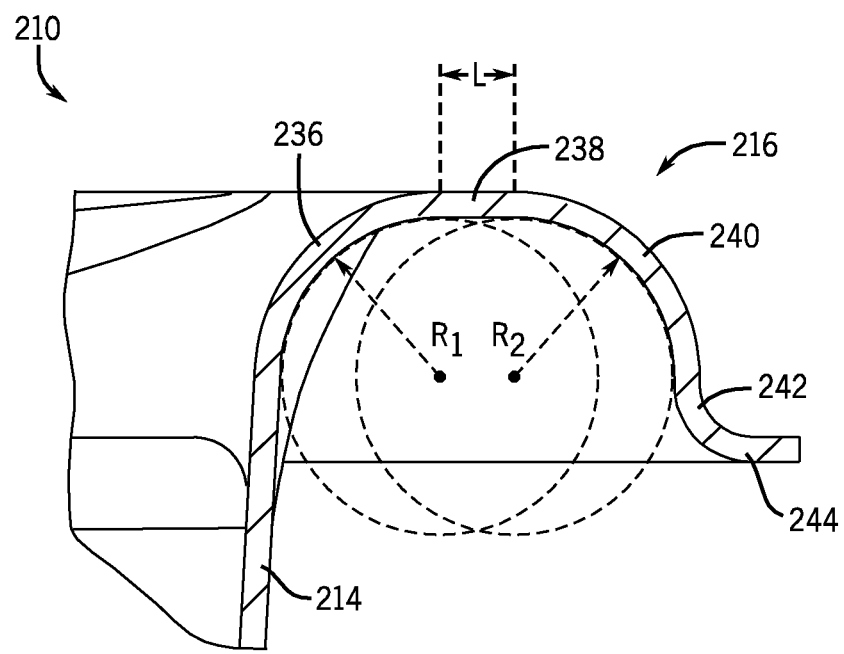
FIG. 7 is a sectional view of the food pan of FIG. 6 taken along area 7-7.

Referring now to FIGS. 6-7, according to an exemplary embodiment, the bottom 212 of the food pan 210 is generally flat and defines a first horizontal plane. The horizontal plane of the bottom 212 extends into a tangent of the corner 234 formed between the bottom 212 and the side wall 214. The side wall 214 then extends tangentially from the corner 234 in a direction substantially orthogonal (e.g., within 15-degrees of perfectly orthogonal) to the horizontal plane. As such, in some embodiments the side wall 214 includes four substantially flat surfaces defining approximately vertical planes, two planes defined by the side wall 214 on the sides 226, 228 of the food pan (see FIG. 4) and two planes defined by the side wall 214 on the sides 222, 224 of the food pan (see FIG. 5). In other embodiments, side wall 214 is not substantially orthogonal to the bottom, but is instead angled with respect thereto by at least more 100-degree or less than 80-degrees. In still other embodiments, a side wall does not include substantially flat surfaces.

Referring to FIG. 7, the rim 216 extends in a hook-shaped contour (see also FIG. 6) away from the side wall 214. In some such embodiments, the rim 216 includes an ascending portion 236 connected to the side wall 214, a top portion 238 connected to the ascending portion 236, and a descending 240 portion connected to the top portion 238. The ascending and descending portions 236, 240 are rounded and the top portion 238 is a flat segment, or is simply a line defined between the ascending and descending portions 236, 240 of the rim 216. In some such embodiments, the rim 216 then flares outward from the end of the descending portion 240 (see, e.g., flared end 244).

In some embodiments the ascending and descending portions 236, 240 have an arc-shaped cross-section defining a radius of curvature $R_1$, $R_2$. The radius of curvature $R_1$ of the ascending portion 236 may be the same or different from the radius of curvature $R_2$ of the descending portion 240. In other embodiments, the rounded portion of either the ascending or descending portion 236, 240 is non-circular and has a radius of curvature that varies as a function of distance from the side wall 214 or otherwise varies. Rounding the ascending and descending portions 236, 240 provides strength to the rim 216, such as by providing a cross-sectional structure able to redistribute loading received by the rim 216 from a wide range of impact directions. However, in other embodiments, the ascending and descending portions 236, 240 of the rim 216 are flat (e.g., square rim).

In some embodiments, the flat plane defined by the side wall 214 extends tangentially to (i.e., into a tangent of) the ascending portion 236 of the rim 216. A tangent of the ascending portion 216 extends into the top portion 238. The descending portion 240 extends tangentially from the top portion 238, around to a substantially flat vertical portion 242. Following the flat vertical portion 242, the rim 216 curves outward to form a flared end 244. Integrating the ascending portion 236 tangentially from the side wall 214 and to the top portion 238, and integrating the descending portion 240 tangentially from the top portion 238 is intended to facilitate control of stresses applied to the rim 216. However in other embodiments, portions of the rim 216 do not extend tangentially into each other.

According to an embodiment, the radii of curvature $R_1$, $R_2$ of the ascending and descending portions 236, 240 of the rim 216 are small, forming a tight curl relative to the size of the food pan 210. According to an exemplary embodiment, the radius of curvature $R_1$, $R_2$ of at least one of the ascending and descending portions 236, 240 of the rim 216 is less than a tenth the height H (FIG. 6) of the pan 210, such as less than a twentieth the height H of the food pan 210. However, in some embodiments, the rim 216 is curled such that the radius of curvature $R_1$, $R_2$ for the ascending and descending portions 236, 240 is more than simply a bend between two flat portions of a rim, and as such is greater than a hundredth the height H of the pan 210, such as greater than a fiftieth the height H of the food pan 210. By way of example, the radius of curvature $R_1$, $R_2$ of the ascending and descending portions 236, 240 of the rim 216 shown in FIG. 6 is about a twenty-fifth the height H of the food pan 210.

According to an exemplary embodiment, the pan 210 includes the top portion 238, which is substantially flat and defines a plane parallel to the plane defined by the bottom portion 212 of the food pan 210. In some such embodiments, the top portion 238 is relatively narrow, only extending a short distance between the ascending and descending portions 236, 240 of the rim 216. According to an exemplary embodiment, the length L of the top portion 236 is less than twice the radius of curvature $R_1$, $R_2$ (constant or variable) of the ascending or descending portion 236, 240 of the rim 216. In some such embodiments, the top portion 238 is less than the radius of curvature 236, 240 of the ascending or descending portion 236, 240. In at least one embodiment, the top portion 238 is simply a line defined by (e.g., demarking) the top most portion of the rim 216, and is not a flat segment.

Figure 8:
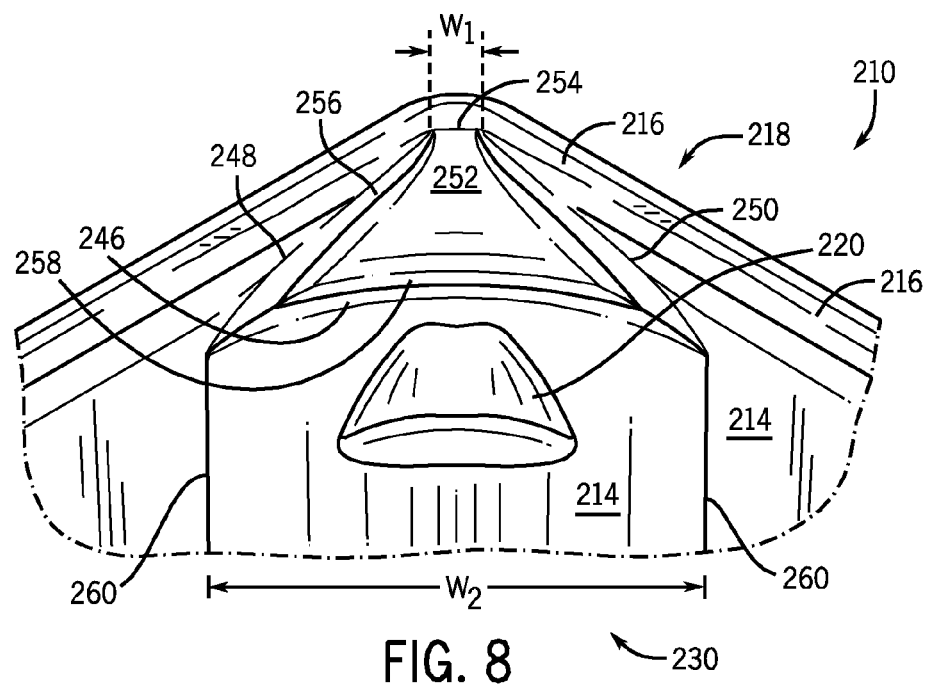
FIG. 8 is a perspective view of a corner of the food pan of FIG. 2.

Referring now to FIG. 8, the corner structure 218 (e.g., reinforcement structure, pour spout) of the food pan 210 is intended to bolster the rim 216. In some embodiments, the food pan 210 includes four corner structures 218, one corresponding to (e.g., above, associated with) each corner 230 of the rectangular periphery of the bottom 212 of the food pan 210 (see, e.g., FIG. 3). According to an exemplary embodiment, the corner structure 218 extends between the side wall 214 and the rim 216, where a portion of the corner structure 218 overlays the rim 216 and intersects with the top portion 238 of the rim 216. In such embodiments, the corner structure 218 does not terminate or diffuse into bottom of the ascending portion 236 of the rim 216, between the side wall 214 and the rim 216, but instead clearly extends up into the rim 216 of the food pan 210. As such, the corner structure 218 of such an embodiment insects (e.g., cuts through, contacts, passes into) both the side wall 214 and the rim 216.

Integration of the corner structure 218 from the side wall 214 into the rim 216 is intended to provide an effective mechanism for strengthening the rim 216 and corners 230 of the food pan 210. Stresses received by the corners 230 are transmitted to both the rim 216 and the side wall 214 through the corner structure 218, instead of being fully absorbed by the rim 216. It is believed that the corner structure 218 of such an embodiment allows for a thinner-gauge material to withstand the impact and loading that would otherwise require a thicker-gauge material to prevent deformation of the food pan 210.

According to an exemplary embodiment the corner structure 218 is formed by three edges or sides: a base side 246, a substantially planar surface 252, and two ascending edges 248, 250 (e.g., sides of the planar surface 252). In such embodiments, the ascending edges 248, 250 extend upward and outward (relative to the volume 232) from ends of the base side 246. According to an exemplary embodiment, the ascending edges 248, 250 are substantially straight. The base side 246 is located along the side wall 214, and the ascending edges 248, 250 extend along the side wall 214, along the ascending portion 236 of the rim 216, and terminate in the top portion 238 of the rim 216. The substantially planar surface 252 extends between the edges 246, 248, 250 of the corner structure 218 (and also gap 254). In some embodiments, the substantially planar surface 252 has slight concavity (e.g., a radius of curvature greater than a foot), while in other embodiments, the substantially planar surface 252 is flat. According to an exemplary embodiment, the substantially planar surface 252 approximately forms a trapezoid or a triangle. In some embodiments, the substantially planar surface 252 (and also substantially planar surface 324) does not extend vertically below the flared end 244.

Still referring to FIG. 8, the ascending edges 248, 250 of the corner structure 218 extend to the rim 216. However, in some embodiments the ascending edges 248, 250 do not connect with each other along the rim 216. Instead, a narrow gap 254 (e.g., space, opening, spout, channel) is formed between the two ascending edges 248, 250 along the rim 216. In some embodiments, the gap 254 is intended to provide a guide, channel, or path for contents of the food pan 210 poured over the corner structure 218. According to an exemplary embodiment, the gap 254 width $W_1$ is narrow relative to the width $W_2$ of the base side 246 of the corner structure 218. In some embodiments, the gap 254 width $W_1$ is less than a tenth the width $W_2$ of the base side 246, such as less than a fifteenth the width $W_2$ of the base side 246.

The gap 254 design is intended to focus stresses propagated by the ascending edges 248, 250 to approximately a single point that is close to the corner structure 218, helping to prevent bending of the corner 230 that may lead to plastic deformation. The gap 254 width $W_1$ is intended to be narrow enough to allow the corner structure 218 to provide strong reinforcement of the rim 216, while also wide enough to provide a guide for pouring of contents (see, e.g., contents 118 as shown in FIG. 1) of the food pan 210. However in other embodiments, the ascending edges 248, 250 of the corner structure 218 connect along the rim 216 and no gap is formed, or in still other embodiments the gap 254 width $W_1$ is wider than a tenth the width $W_2$ of the base side 246. In some embodiments, the gap 254 includes a soft radius or is slightly rounded to facilitate pouring and provide an arched structure.

Figure 9:
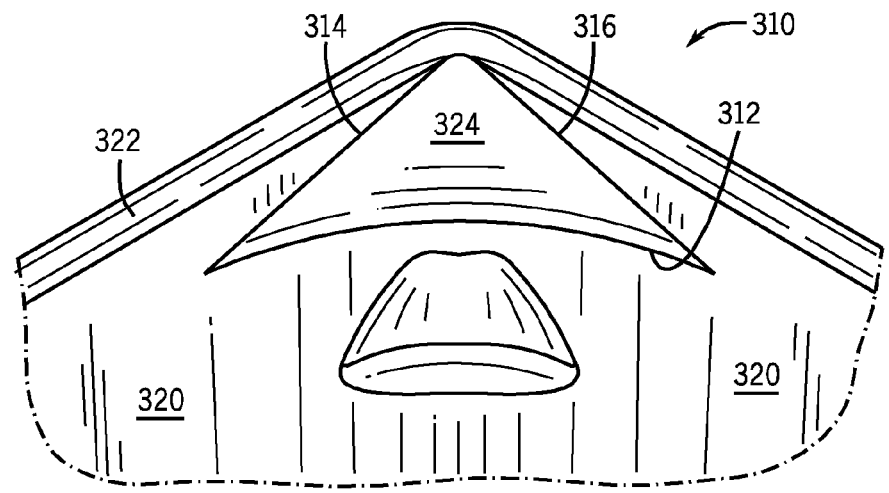
FIG. 9 is a perspective view of a corner of a food pan according to another exemplary embodiment.

Referring to FIG. 9, corner structure 310 according to another embodiment includes a base side 312 connected to two ascending sides 314, 316. The ascending sides 314, 316 are formed by a tight bend 318 (e.g., short radius) between a side wall 320 and a rim 322 relative to a substantially planar surface 324 of the corner structure 310, in contrast to the ascending edges 248, 250 of the food pan 210 shown in FIG. 8, which are formed by a wider bend 256. Similarly, the base side 312 of the corner structure 310 sharply bends between the substantially planar surface 324 and the side wall 320, as opposed to the corresponding more-gradual transition 258 shown in FIG. 8.

Referring now to FIGS. 8-9, rounding the ascending edges 248, 250 and base side 246 of the corner structure 218 into the adjoining side wall 214 and rim 216 as shown in FIG. 8 is preferred, in some embodiments, due to the reduction of stress concentrations. However, in other embodiments, a well-defined crease is used as reinforcement in a particular direction. For example, the curvature of the base side 246 in FIG. 8 does not extend tangentially into the side wall 214, in contrast to the base side 312 of the corner structure 310 of FIG. 9. Instead, the corner structure 218 in FIG. 8 includes a vertically extending crease 260, which may strengthen the pan 210 in the vertical direction.

According to an exemplary embodiment, the base side 246, 312 of the corner structure 218, 310 is vertically above or substantially aligned horizontally with the flared end 244 of the rim 216 (see generally FIG. 4-5), helping to avoid interfering contact of the corner structure 310 with a well (see, e.g., well 114 as shown in FIG. 1). In other embodiments, the corner structure 218 extends below the rim 216 (e.g., such as by about a half inch), providing a ramp (not shown) by which the food pan may be lifted from a food well, if pulled horizontally against the ramp. In still other contemplated embodiments, the base side of the corner structure is adjacent to the bottom of the food pan, and the ascending sides extend approximately the full vertical height of the food pan. In such contemplated embodiments, an anti jam feature may be positioned outside of the corner of the food pan.

Figure 10:
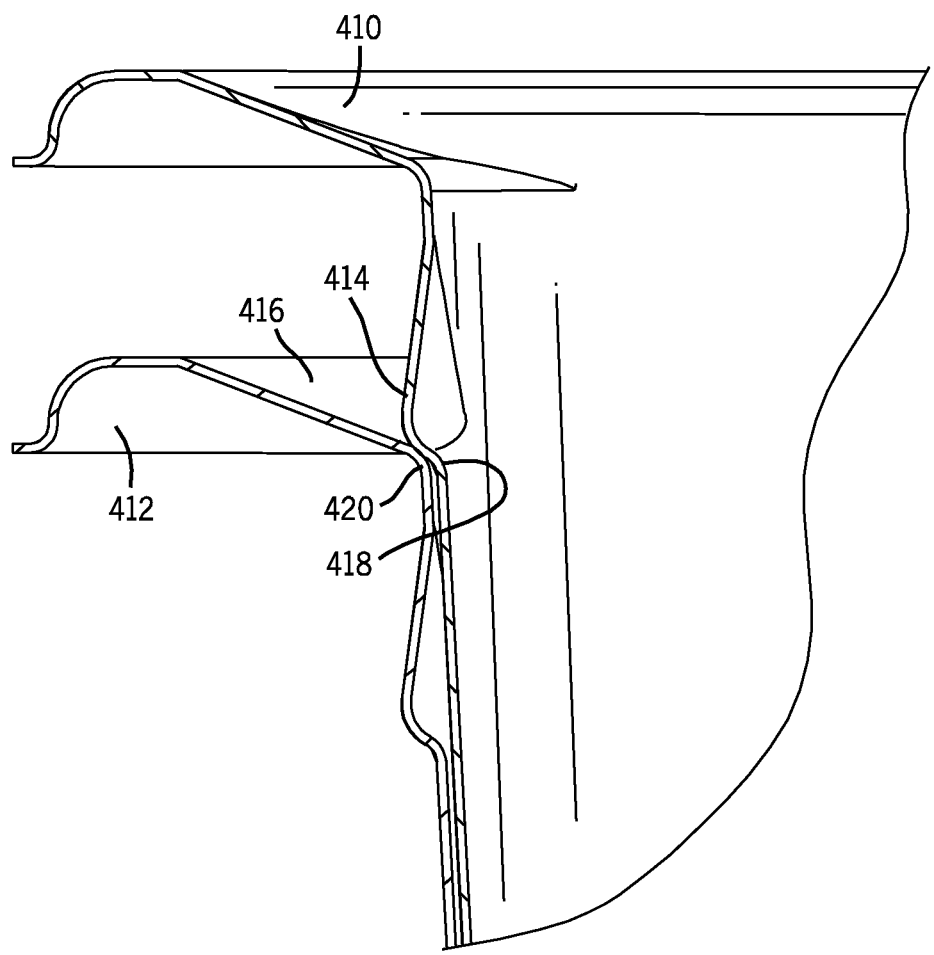
FIG. 10 is a side view of corners of two stacked food pan according to an exemplary embodiment.

Referring now to FIG. 10, a first food pan 410 is stacked on a second food pan 412. The anti jam feature 414 of the first food pan 410 extends outward to rest upon the corner 416 structure of the second food pan 412. In some embodiments, the anti jam feature 414 includes a bottom side 418 having an angle designed to match the angle of the planar portion 420 of the corner structure 416 of an identical food pan. Placement of the anti-jam feature 414 of the first pan 410 on top of the corner structure 416 of the second pan 412 helps to separate the food pans 410, 412, keeping air in between the food pans 410, 412. Further, placement of the anti-jam feature 414 of the first pan 410 on top of the corner structure 416 of the second pan 412 helps to stabilize a stack of such pans 410, 412 by aligning the pans 410, 412 in a stable configuration.

The construction and arrangements of the food pan, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A food pan for use with a serving station having wells within which to support the food pan, the food pan comprising:
   a bottom having a substantially rectangular periphery;
   a side wall connected to the bottom, wherein the side wall projects from the rectangular periphery of the bottom in an upward direction, wherein the bottom and side wall together form a volume configured to support contents of the food pan, and wherein an angle defined between the bottom and the side wall of the food pan is between 90- and 100-degrees;
   a rim connected to the side wall on an end thereof opposite to the bottom, wherein the rim extends from the side wall in an outward direction away from the volume formed by the side wall and the bottom, and wherein the cross-section of the rim further comprises:
      an ascending portion connected to the side wall,
      a top portion connected to the ascending portion, and
      a descending portion connected to the top portion, wherein the ascending and descending portions are rounded; and
   four corner structures located between the side wall and the rim, each corner structure associated with one of the corners of the rectangular periphery of the bottom of the food pan, wherein each corner structure further comprises:
      a base side connected to the side wall,
      two ascending edges connected to the base side and extending along both the side wall and the ascending portion of the cross-section of the rim, and
      a substantially planar surface extending between the base side and ascending edges,
      wherein the substantially planar surface of the corner structure has a slight concavity,
      wherein the ascending edges are rounded, extend upward and outward from opposite ends of the base side, and terminate at an end in the top portion of the cross-section of the rim, and
      wherein the ends of the two ascending edges opposite to the base side for each corner structure are spaced apart from each other along the top portion of the rim, forming a gap therebetween for pouring the contents of the food pan therethrough.

2. The food pan of claim 1, wherein the length of the gap is less than one-tenth the length of the base side of each corner structure.

3. The food pan of claim 1, wherein the base side of each corner structure is rounded.

4. The food pan of claim 3, wherein the side wall includes four flat surfaces extending between each of the corner structures, and wherein the rounded base side of each corner structure extends tangentially into an adjoining two of the four flat surfaces of the side wall.

5. The food pan of claim 3, wherein the side wall includes four flat surfaces extending between each of the corner structures, and wherein the rounded base side of each corner structure has a radius of curvature that is too large to extend tangentially into an adjoining two of the four flat surfaces, forming vertical creases therebetween.

6. A food pan for use with a serving station having wells within which to support the food pan, the food pan comprising:
- a bottom having a substantially rectangular periphery;
- a side wall connected to the bottom, wherein the side wall projects from the rectangular periphery of the bottom in an upward direction, and wherein the bottom and side wall together form a volume configured to support contents of the food pan;
- a rim connected to the side wall on an end thereof opposite to the bottom, wherein the rim that extends from the side wall in an outward direction, away from the volume formed by the side wall and the bottom, and wherein the cross-section of the rim further comprises:
    - an ascending portion connected to the side wall,
    - a top portion connected to the ascending portion, and
    - a descending portion connected to the top portion, wherein the ascending and descending portions are rounded; and
- four corner structures separate from and located between the side wall and the rim, each corner structure associated with one of the corners of the rectangular periphery of the bottom, wherein each corner structure further comprises:
    - a base side connected to the side wall,
    - two ascending edges connected to the base side and extending along both the side wall and the ascending portion of the cross-section of the rim, and
    - a substantially planar surface extending between the base side and ascending edges,
    - wherein the ascending edges extend upward and outward from opposite ends of the base side and terminate at an end in the top portion of the cross-section of the rim, and
    - wherein the ends of the two ascending edges opposite to the base side for each corner structure are spaced apart from each other along the top portion of the rim, forming a gap therebetween for pouring the contents of the food pan therethrough, wherein the length of the gap is less than one-tenth the length of the base side of each corner structure;
- wherein at least one of the ascending portion and the descending portion of the cross-section of the rim has a radius of curvature that is greater than the cross-sectional length of the top portion of the rim, wherein the ascending portion and the descending portion of the cross-section of the rim have about the same radius of curvature;
- wherein the base side of each corner structure is rounded; and
- wherein the side wall includes four flat surfaces extending between each of the corner structures, and wherein the rounded base side of each corner structure has a radius of curvature that is too large to extend tangentially into an adjoining two of the four flat surfaces, forming vertical creases therebetween.

7. A food pan, comprising:
- a bottom having a substantially rectangular periphery;
- a side wall connected to the bottom, wherein the side wall projects from the rectangular periphery of the bottom in an upward direction, and wherein the bottom and side wall together form a volume configured to support contents of the food pan;
- a rim connected to the side wall on an end thereof opposite to the bottom, wherein the rim extends from the side wall in an outward direction, away from the volume formed by the side wall and the bottom, and wherein the cross-section of the rim further comprises:
    - an ascending portion connected to the side wall,
    - a top portion connected to the ascending portion, and
    - a descending portion connected to the top portion, wherein the ascending and descending portions are rounded; and
- four corner structures separate from and located between the side wall and the rim, each corner structure associated with one of the corners of the rectangular periphery of the bottom, wherein each corner structure further comprises:
    - a base side connected to the side wall,
    - two ascending edges connected to the base side and extending along both the side wall and the ascending portion of the rim, and
    - a substantially planar surface extending between the base side and ascending edges,
    - wherein the substantially planar surface of the corner structure has a slight concavity, and
    - wherein the ascending edges are rounded, extend upward and outward from opposite ends of the base side, and terminate at an end in the top portion of the cross-section of the rim;
- wherein the ends of the two ascending edges opposite to the base side for each corner structure are spaced apart from each other along the top portion of the rim, forming a gap therebetween for pouring the contents of the food pan therethrough; and
- wherein the length of the gap is less than one-tenth the length of the base side of each corner structure.

8. The food pan of claim 7, wherein the length of the gap is less than one-fifteenth the length of the base side of each corner structure.

9. The food pan of claim 7, wherein at least one of the ascending portion and the descending portion of the cross-section of the rim has a radius of curvature that is greater than the cross-sectional length of the top portion of the rim.

10. The food pan of claim 1, wherein the four corner structures are separate from the side wall and the rim.

11. The food pan of claim 6, wherein the ascending edges of each corner structure are rounded.

* * * * *